United States Patent Office 3,521,371
Patented July 21, 1970

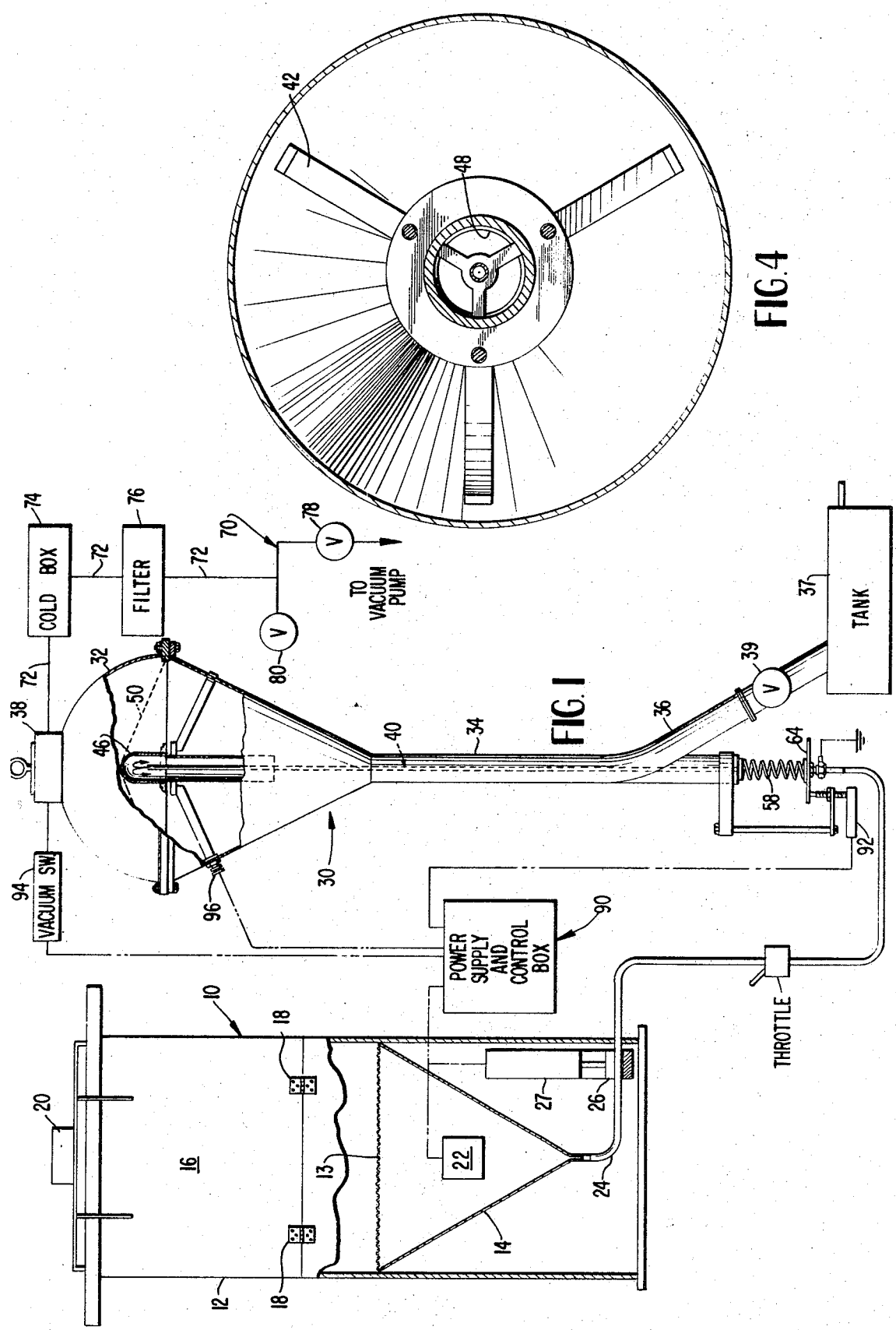

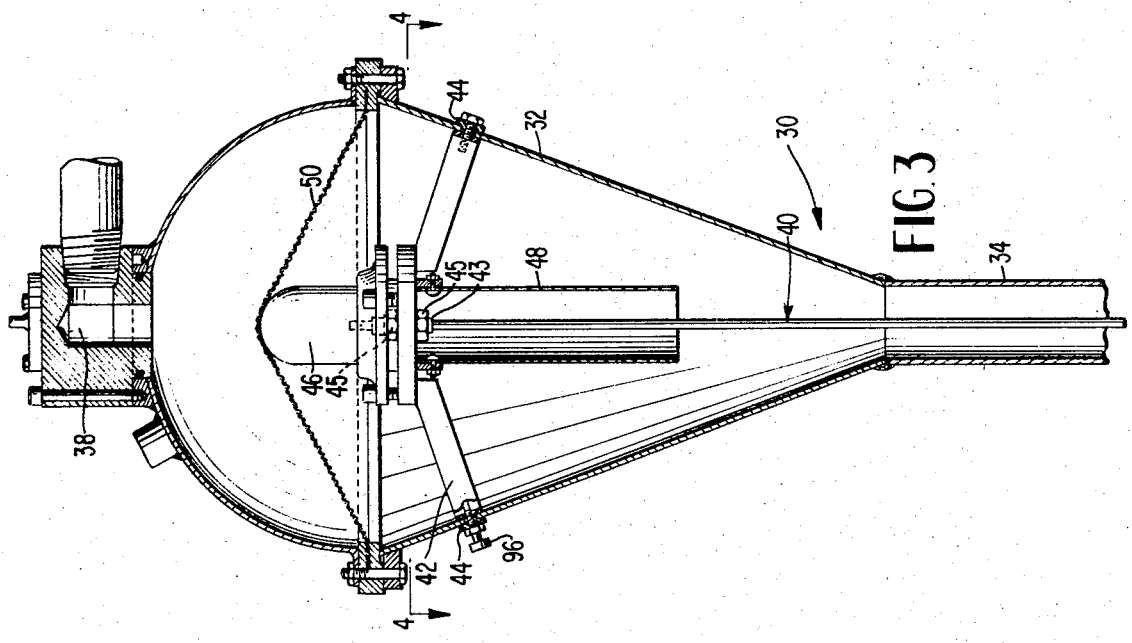
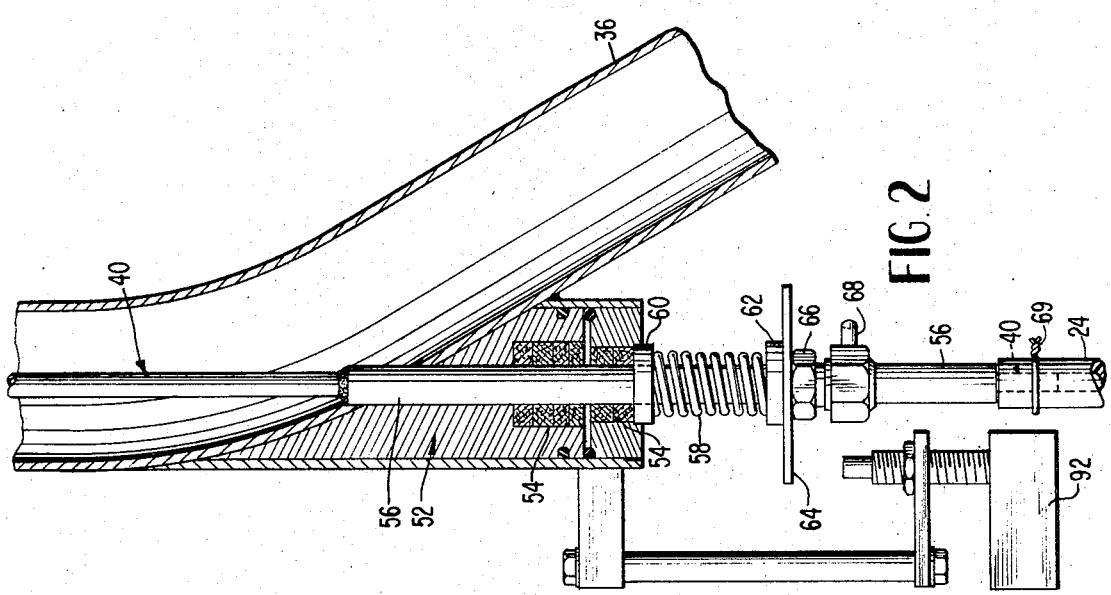

3,521,371
METHOD AND APPARATUS FOR TRANSFERRING AND TREATING PARTICULATED SOLID MATERIALS
August L. Kraft, Roselle Park, N.J., assignor to Automatic Process Control, Inc., Union, N.J., a corporation of New Jersey
Filed June 20, 1968, Ser. No. 747,616
Int. Cl. F26b 5/04
U.S. Cl. 34—15
10 Claims

ABSTRACT OF THE DISCLOSURE

A system is disclosed for transferring particulate solid materials, such as silica flour, from a storage device, such as a bag, to a point of use, such as a mixing tank, while simultaneously removing occluded volatiles by vacuum.

---

This invention relates to materials handling and in particular provides a method and apparatus for efficient, clean transfer of particulate solid materials to a point of use while simultaneously removing occluded volatiles, such as moisture and trapped air.

Particulate solid materials, such as alumina, sand, particularly silica flour, mica, talc and the like are used in numerous manufacturing operations, especially in the plastic products industry, where they must be loaded from a storage bin or bag to a mixing vessel or the like. Frequently the material must also be dried or otherwise treated to remove occluded volatiles before usage. At times the material must even be delivered into a vacuum, as, for example when mixing a particulate solid filler in a resin-catalyst system which is to be cast in vacuum.

Heretofore the practice has usually been to dump the material in shallow trays and heat it in an oven, if occluded volatiles, such as moisture, are to be removed, and the material is then dumped into the mixing vessel or other container at its point of use. In such practice the inevitable and undesirable scattering of fines throughout the place of usage of a particulate solid material is the earmark of such usage. If the vessel into which the material is dumped is evacuated, all the material must be loaded before vacuum can be drawn and occluded volatiles, such as entrapped air, can be removed only under inefficient conditions in the evacuated vessel. If after heating in the oven the material must stand around before usage, it picks up moisture from the air, unless stored in a special atmosphere, and may well upset the delicate chemical balance of the resin-catalyst or other system in which the material is later used.

It is thus the primary object of this invention to provide a method and apparatus for transferring particulate solid materials from a place of storage to a point of usage in which such transfer is effected efficiently without scattering of fines, in which provision is made to remove occluded volatiles during such transfer and in which the materials can be delivered at controlled rates, as required, even into an evacuated vessel without trapped air, if required.

This and other objects of this invention are basically obtained utilizing a closed transfer system in which the particulate solid material is syphoned into a closed, evacuated tank through a tube. Preferably a portion of which tube is heated to heat the stream of particulate solid material flowing through the tube to condition the volatiles for separation from the particulate materials. The volatiles are removed by the evacuation system while the thusly treated materials are removed, for example by gravity, separately into the container or other device in which they are to be used, which container can be an evacuated vessel.

It is preferred that the heated tube portion be heated by utilizing the tube as a resistance heater. To this end the heated tube should have minimal wall thickness in order to increase its resistivity. Moreover the tube diameter should be as small as consistent with the desired flow rate of particulate solid material to maximize both electrical resistance and radiant heat transfer from the tube wall to the materials flowing through the tube.

Two practical problems are presented by the use of the resistance heated tubes in this invention namely the need to support the tube with electrical isolation and to accommodate such support to the thermal linear expansion of the tube when heated. In addition the use of thin wall, small diameter tubes also presents the problem of bowing of the tube during expansion.

In the embodiment shown in the accompanying drawings to which reference is further made below these problems are solved by locating the heated portion of the transfer tube almost entirely within the evacuated tank, but spaced from the walls of the tank to provide electrical isolation of the heated tube portion. In this arrangement the lower end of the heated tube is secured in and extends through the wall of the tank while the upper end is positioned centrally within an enlarged upper portion of the tank and is supported, for example by a spider, spaced from the walls of the tank. The tube is also tensioned, for example by a spring mounted at one of the ends of the tube to take up linear expansion during warm-up, and the tube is insulated from its support at one or both ends to permit its connection across a power supply. The tension mount by taking up linear expansion not only accommodates such expansion but also prevents bowing of the tube. Preferably the lower end of the tank is necked down to form a depending material collection leg which is coaxially positioned spaced about the lower portion of the heated tube which at the lower end of the heated tube diverges from the heated tube to form a gravity chute for gravity delivery of treated material to its desired place of use.

For a more complete understanding of the invention reference is made to the accompanying drawings in which:

FIG. 1 is a schematic view of the apparatus of this invention;

FIG. 2 is an enlarged vertical section of a portion of the apparatus shown in FIG. 1;

FIG. 3 is an enlarged vertical section of another portion of the apparatus; and

FIG. 4 is a horizontal section taken at plane 4—4 in FIG. 3.

Referring more particularly to FIG. 1, which shows in schematic view an arrangement of apparatus suitable according to the present invention for transferring and treating solid particulate material, the reference numeral 10 designates a bag loader for receiving bagged particulate solid material which is to be handled by the apparatus. The apparatus shown generally further includes a treating vessel 30 in which is mounted a heater tube 40, and a vacuum system 70 and a control system 90.

Bag loader 10 is an upright rectangular bin 12 generally having proportions slightly larger than a conventional 100 lb. sand bag. The lower end of bag loader 10 is funnel-shaped to form a hopper 14, and a screen 13 is positioned across the top of hopper 14 to prevent coarse particulate material, paper and the like from being drawn into the system.

The front face of bag loader 10 is in the form of a pull-down door 16 which is hinged at its lower end at 18 and is sized to receive a 100 lb. bag on it. Door 16 is preferably gasketed so that when shut it is completely tight, preventing escape of fines from bag loader 10

When door 16 is closed, bag loader 10 is entirely sealed except for an opening 20 on its upper end which is provided with a filter cover, also to prevent escape of fines. The underside of hopper 14 on one side is provided with a conventional vibrator 22 to assist in gravity feed of material through hopper 14. The lower end of hopper 14 is connected to one end of a flexible tube 24, for example, ⅜ inch inside diameter Tygon hose, which leads to lower end of heater tube 40. A clamp 26 is provided to permit or shut off flow through tube 24 under the control of an air operated cylinder 27.

Treating vessel 30 is a vertically elongated aluminum tank having an enlarged head 32 forming a separation chamber and a depending leg 34 for collecting material free-falling in tank 30 and delivering it to a sidewardly declining side leg 36 which forms a chute leading through a ball valve 39 to an evacuated resin tank 37. Resin tank 37 typically is a reservoir for dispensing apparatus and can be provided with an agitator and heating coils as required. The top of tank 30 is provided with a vacuum port 38 for connection to vacuum system 70.

Heater tube 40 is positioned vertically in tank 30 with the lower portion of tube 40 positioned coaxially in leg 34 such that the walls of tank 30 are spaced from tube 40. The upper end of tube 40 opens centrally in head 32. A spider 42 is mounted in head 32 (see also FIGS. 3 and 4) and is secured to the walls of tank 30 by means of insulated bushings 44. Tube 40 in the illustrated case is approximately 7 feet long, ⅜ inch outside diameter stainless steel having a wall thickness of 0.006 inch and hence is essentially fragile. It is therefore secured at its upper end to the center of the spider 42 by braising a threaded adaptor sleeve 43 about the upper end of tube 40 which is secured by means of nuts 45 through a central opening in spider 42.

A dome 46 of Pyrex glass, which serves to function as a baffle, is mounted on spider 42 over the open upper end of tube 40 such that material drawn upwardly through tube 40 strikes dome 46 and is diverted downwardly through openings in spider 42 into tank 30. An aluminum sleeve 48 is secured to the underside of spider 42 aligned beneath dome 46 to further insure carrying material falling from dome 46 down into head 32 of tank 30. A filter 50 is stretched across the interior of head 32 above spider 42 and dome 46 to prevent escape of fines upwardly through vacuum port 38 located above filter 50.

At the lower end of leg 34, where it joins the upper end of side leg 36, tube 40 extends slidably through the wall of tank 30 in a bearing 52 formed as an extension of the lower end of vertical leg 34 (see also FIG. 2). Bearing 52 is provided with seals 54 to insure that the joint between tube 40 and bearing 52 is air-tight. As in the case of the upper end of tube 40, the lower end of tube 40 is also provided with a braised adaptor sleeve 56 as it passes through bearing 52 in order to protect the otherwise fragile tube 40. The lower end of tube 40 and the lower end of sleeve 56 extend out through seals 54 and carry a coil spring 58, the upper end of which bears against a pad 60 resting under the underside of bearing 52 and seals 54. The lower end of spring 58 bears against a seat 62 carried on the upper surface of a wide collar 64, positioned by an adjustment nut 66 threadedly received on the lower end portion of sleeve 56. Below adjustment nut 66, a grounding lug 68 in the form of a nut having a projecting stud, is threadedly mounted on sleeve 56. The tip of the lower end of tube 40 projects just below the lower end of sleeve 56 and receives the end of tubing 24 which is secured, for example, by wire clamp 69 on tube 40.

Vacuum system 70 basically includes a pipe system 72 connected to vacuum port 38 which leads through a cold box 74, filter 76 and ball valve 78 to a vacuum pump, for example, a single stage mechanical vacuum pump capable of pulling a vacuum during operation on the order of 10 mm. Hg absolute. Pipe 72 is also provided with a line vent having a ball valve 80 which vent is connected intermediate filter 76 and valve 78 to permit venting the system.

Control system 90 includes three micro-switches 92, only one of which is shown, mounted to the exterior of bearing 52 and positioned to be actuated by downward movement of collar 64 which thus functions as a switch operator. Control system 90 further includes a vacuum operated switch 94 connected to vacuum port 38 which closes when a predetermined maximum vacuum has been attained and opens at a predetermined minimum vacuum. A terminal lug 96 is mounted through one of the bushings 44 and connected to spider 42. Hot A.C. power is connected through control system 90 to terminal 96, while lug 68 is grounded to neutral. Control system 90 further includes circuits responsive to the actuation of switches 92 for controlling application of power to terminal 96 and circuits for connecting and disconnecting air supply to cylinder 27 in response to an operator's signal. Control system 90 is also provided with circuits for connecting power to actuate virbrator 22 and to control the vacuum pump to which pipe 72 leads.

In operation control system 90 is first energized to actuate the vacuum pump to start drawing vacuum until the pre-determined maximum vacuum required to actuate switch 94 is obtained. Switch 94 disables the control circuits for shutting off the air supply to cylinder 27 until switch 94 is actuated and closes. While switch 92 is open, air is supplied by cylinder 27 to hold clamp 26 closed. As power is turned on it is connected across terminal lug 96 and ground lug 68 to apply power to tube 40 which has in the illustrated case a resistance of ½ ohm. Tube 40 expands as it heats up, and such expansion is taken up by the tension exerted on tube 40 by compressed spring 58 such that collar 64 moves downwardly.

The three switches 92 are arranged to be actuated as collar 64 descends. The first switch 92 typically in the case of treating and transferring silica flour should be set to be actuated by the expansion of tube 40 as it reaches an average temperature of 500° F., in the illustration apparatus 5/16 inch of travel. Until the first such switch 92 is actuated control system 90 disables the circuits for releasing cylinder 27. The second switch 92 is set to be actuated by the expansion of tube 40 when it reaches an average temperature in the case of silica flour of about 900° F., in the illustrated apparatus ⅝ of 1 inch. The second switch 92 controls the application of power to tube 40, and when it is actuated it disconnects the power supply. As it is deactuated by upward movement of collar 64, as tube 40 cools, it reconnects the power supply to maintain the temperature of tube 40 at a set point. By use of SCR's for controlling the application of power to tube 40 and by using full wave unfiltered rectified A.C. to operate the SCR's, the power to tube 40 will fluctuate at a rate of 120 times per second when the operation switch 92 is actuated. The third switch 92 is set to be actuated by limited overtravel of tube 40 beyond that causing actuation of the second switch 92 and functions as a safety switch to disable the apparatus when actuated. In the illustrated apparatus the over-travel of tube 40 should not be greater than about 0.05 to .1 inch.

When the vacuum has been pulled sufficiently to actuate vacuum switch 94 to energize the control circuits for releasing cylinder 27, for example, at a vacuum of 40 mm. Hg in the case of silica flour, and when the temperature of tube 40 is sufficient to cause its expansion to actuate the first of the switches 92 to complete the energization of the circuits for controlling cylinder 27, operation of the apparatus can be initiated to transfer material from bag loader 10 to tank 37.

In the meantime, it is of course necessary to load bag loader 10. This is done by pulling down door 16 through an arc of almost 180°, resting the bag on the inner face of door 16 which is suiatbly provided with spikes for retaining the bag in position. The upper end of the bag is then opened, and door 16 then raised and shut, carrying the bag into loader 10 with its open upper end facing downwardly to discharge the contents of the bag into hopper 14. When it is desired to load material from loader 10 to tank 37, valve 39 must of course be opened. The same vacuum pump to which pipe 72 is attached desirably is also connected to draw the same vacuum on resin tank 37, and on opening of valve 39 any differential in pressure between that in tank 30 and that in tank 37 will be equalized.

Control circuit 90 is then operated to disconnect the air supply to cylinder 27 to release clamp 26. The material loaded in bag loader 10 is syphoned through tube 24 up heater tube 40 into tank 30. Depending on the pressure in tank 30 and the particular solid material chosen, feed rates using 3/8 inch tubing as described above can vary anywhere from 5 to 30 pounds per minute. In the case of silica flour using a 27 cubic foot per minute vacuum pump at a vacuum of 8 mm. Hg the rate of flow is 15 pounds per minute.

As the material rises in tube 40, it is heated by the intense radiation from the hot tube to drive off moisture such such that, as the material is diverted by dome 46 and falls freely into tank 30, the trapped air and moisture are conditioned to be separated in tank 30 and drawn upwardly through filter 50 into vacuum system 70 where liquefiable volatiles are recovered in cold box 74 and any solid fines passing through filter 50 are trapped in filter 76. The treated particulate solid material falls freely, lumplessly and dry through leg 34 then through leg 36 and valve 39 into tank 37 at a continuous rate which can be controlled by adjustably throttling flexible tube 24.

Although the description above has been mainly directed to transferring a particulate solid material from one point to another while heating under vacuum to remove occluded volatiles, the same apparatus and processing technique, when applied to a material, such as alumina, can activate the material to cause it to become catalytic, if heater tube 40 is at temperatures of 850° F. or higher. Thus the apparatus can be used to activate alumina catalyst. When using alumina filler, therefore, some care should be taken to account for the catalytic effect of the material after treatment when it is used in resin systems for which alumina is a catalyst when activated.

In addition, although the preceding description has been of one specific apparatus, in accordance with the present invention, other apparatus can be utilized to accomplish the same ends. For example, instead of utilizing a sliding joint at the lower end of tank 30 where heater tube 40 enters the tank to accommodate tube expansion exteriorly of tank 30, tube expansion can be taken up entirely within the tank. A spring tension arrangement similar to that provided at the lower end of tube 40 in the apparatus shown in the drawings could be provided at the upper end of tube 40 where it is secured to spider 42. In such an arrangement the lower end of the tube 40 is secured firmly at the lower end of tank 30 avoiding the necessity of seals for the sliding tube, since it would be fixed at such lower end. In such an arrangement, furthermore since linear movement of the heater tube does not take place exteriorly of tank 30, an alternate system for determining the temperature of tube 40 is required. Such a system can be readily provided by including tube 40 in a measuring circuit such that its temperature can be measured by its resistance.

In the illustrated case, tube 40 has been described as made of stainless steel. In practice, any conductive material could be used, assuming tube 40 were to be heated by resistance heating, as illustrated. Preferably, such material should be inert at high temperatures and abrasion resistant. Other materials which can be readily used are chromium, Hastelloy, tantalum and graphite.

A number of precautions suggest themselves in using apparatus of the type described, and elaborate discussion does not seem necessary here. However, it should be noted that a high velocity solid material traveling in a plastic tube, such as tube 24, can cause excessive static build up on the tube. Desirably, either a semi-conductive coating of other static drain arrangement, or a conductive tube should be used.

I claim:
1. A method of transferring particulate solid materials while removing occluded volatiles therefrom comprising the steps of:
   drawing a stream of particulate solid material from a source through an elongated tube by vacuum,
   discharging the resultant stream of material from said tube into an enlarged evacuated separation zone,
   collecting the resultant material, and
   evacuating the separated occluded volatiles from the separation zone.

2. Apparatus for transferring solid particulate materials while removing occluded volatiles therefrom comprising:
   an elongated tube,
   vacuum means for drawing a stream of solid particulate material through said tube,
   said vacuum means including means defining an evacuated separation chamber in fluid communication with the discharge end of said tube for receiving the resultant stream wherein the occluded volatiles are separated from the material and evacuated by the vacuum means, and
   means for collecting the resultant material.

3. Apparatus according to claim 2 in which said means defining a separation chamber is a tank, in which at least a portion of said tube is located in said tank and spaced from the walls thereof along the length of said tube portion with the lower end of said tube portion extending through the wall of said tank for connection to a source of particulate solid material and with the discharge end of said tube portion being the upper end thereof and located in said tank spaced from the walls thereof.

4. An apparatus as defined in claim 2 and wherein a portion of said tube is a straight thin-walled, fragile metal tube portion, anchoring means for anchoring one end of said tube portion, bearing means for slidably receiving the other end of said tube portion to allow linear movement thereof upon expansion and contraction, tension means for placing said tube portion under tension.

5. Apparatus according to claim 2 which further includes means for heating at least a portion of the tube to heat said particulate solid material in said tube by radiation to condition said occluded volatiles for separation from the material.

6. Apparatus according to claim 5 in which said heating means includes the electrical resistance of said heated portion of said tube and means for passing an electric current therethrough.

7. Apparatus according to claim 2 in which a deflector is positioned in said separation chamber adjacent to the discharge end of said tube to disperse and direct particulate material issuing from said tube into said separation chamber toward said collecting means.

8. A treating vessel for removing occluded volatiles from particulate solid materials and delivering said materials to a point of use which includes:
   a closed, upright tank having an enlarged head forming a separation chamber and a depending elongated portion forming a collection leg,
   an elongated, thin-walled heater tube positioned in said tank spaced from the walls thereof along the length of said tube extending through the wall of said vessel at the lower end of said tube for connection to a source of particulate solid material to be treated, the upper end of said tube terminating in and in communication with said separation chamber, anchoring means for anchoring one end of said tube,
bearing means for slidably receiving the other end of said tube to allow linear movement thereof upon expansion and contraction,
insulating means for electrically insulating said tube from the walls of said vessel at least at one end of said tube,
means for evacuating said vessel,
means for heating said tube by passing an electric current therethrough, and
means for withdrawing particulate solid material from the lower end of said leg.

9. A treating vessel according to claim 8 which further includes tension means for placing said tube under tension.

10. A treating vessel according to claim 8 in which is included a means for deflecting and directing particulate material issuing from said tube into said separation chamber toward said collection leg.

References Cited

UNITED STATES PATENTS

| | | | |
|---|---|---|---|
| 1,250,496 | 12/1917 | Passburg | 34—15 |
| 2,283,319 | 5/1942 | Dienst | 34—92 |
| 2,448,272 | 8/1948 | Payne | 34—15 |
| 2,465,963 | 3/1949 | Beardslee | 34—15 |
| 2,849,381 | 8/1958 | Berg | 34—15 |
| 2,874,113 | 2/1959 | Smith | 34—15 |

WILLIAM J. WYE, Primary Examiner

U.S. Cl. X.R.

34—92